United States Patent [19]

Mehrgardt

[11] Patent Number: 4,694,325

[45] Date of Patent: Sep. 15, 1987

[54] INTERFACE CIRCUIT CONTAINED IN A COLOR-TELEVISION RECEIVER AND SERVING TO CONNECT A HOME COMPUTER

[75] Inventor: Soenke Mehrgardt, March, Fed. Rep. of Germany

[73] Assignee: Deutsche ITT Industries GmbH, Freiburg, Fed. Rep. of Germany

[21] Appl. No.: 795,660

[22] Filed: Nov. 6, 1985

[30] Foreign Application Priority Data

Nov. 16, 1984 [EP] European Pat. Off. ........ 84113893.6

[51] Int. Cl.$^4$ ............................................ H04N 11/22
[52] U.S. Cl. ........................................ 358/11; 358/140
[58] Field of Search ................... 358/11, 140; 340/728

*Primary Examiner*—James J. Groody
*Assistant Examiner*—David E. Harvey
*Attorney, Agent, or Firm*—Thomas L. Peterson

[57] ABSTRACT

An interface circuit is provided which permits a color-television receiver with digital signal-processing circuitry which reproduces the video signal at twice the horizontal frequency to be connected to a home computer whose clock-signal system is not synchronized with that of the color-television receiver. For each color character signal, the interface circuit contains two digital delay lines, one data register, two code converters, one line memory, and one multiple switch.

4 Claims, 4 Drawing Figures

INTERFACE CIRCUIT CONTAINED IN A COLOR-TELEVISION RECEIVER AND SERVING TO CONNECT A HOME COMPUTER

BACKGROUND OF THE INVENTION

The invention pertains to a circuit arrangement for interfacing a television receiver to a home computer.

More specifically, the present invention relates to an interface circuit in a color-television receiver for providing the connection between the color-television receiver and a home computer which delivers at least one-bit digital color character signals whose minimum pulse duration is only approximately equal to the period of the clock signal. The invention is particularly applicable to a television receiver which reproduces a video signal containing interlaced fields after analog-to-digital conversion by means of a sampling signal, after digital signal processing in a digital circuit system controlled by the sampling signal or one of the harmonics thereof, which is used as a clock signal, and after digital-to analog conversion at twice the horizontal frequency.

In color-television using interlaced scanning, which permit the video signal to be reproduced line by line at twice the horizontal frequency, the analog video signal is processed digitally after analog-to-digital conversion and then converted back into analog form before being fed to the picture tube. As the digital video signal is written into a line memory at the horizontal frequency and read from this memory at twice the horizontal frequency, better flicker-free performance is obtained than with color-television receivers which do not reproduce the video signal at twice the horizontal frequency.

Conventional color-television receivers can be used to reproduce character signals delivered by a home computer. To do this, it is customary to bypass the subcircuits required for television reception and to feed the character signals, accompanied by horizontal and vertical synchronizing signals, to the picture tube.

This simple method of reproducing home-computer character signals is not readily applicable to the above-described color-television receivers with digital signal-processing circuitry etc., because the clock-signal system of the home computer and that of the color-television receiver are not frequency- and phase-synchronized.

SUMMARY OF THE INVENTION

It is, therefore, the object of the invention to provide an interface circuit of the above kind which provides the connection between a color-television receiver and a home computer that delivers the character signals mentioned above.

One of the advantages offered by the invention is that the individual characters (letters, digits, etc.) appear on the screen with constant brightness and in constant color, so that writing of uniform brightness and uniform color saturation color is presented on the entire screen.

BRIEF DESCRIPTION OF THE DRAWING

The invention will be better understood from a reading of the following detailed description in conjunction with the drawing in which.

DETAILED DESCRIPTION

Figure 1:
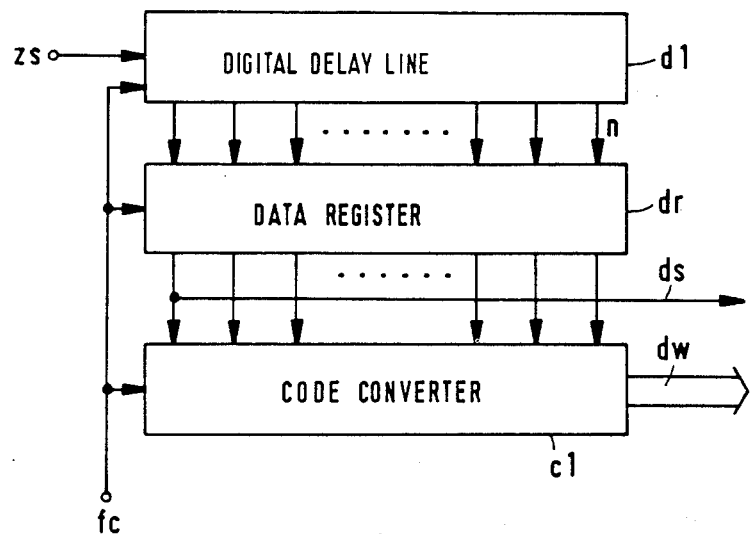
FIG. 1 is a block diagram of a subcircuit of the invention.

The embodiment of an input subcircuit of the invention shown in the block diagram of FIG. 1 includes the first digital delay line d1, which consists of n like, cascaded delay stages and gives a delay equal to the period of the clock signal fc; in the above-mentioned color-television receivers with digital signal-processing circuitry, the frequency of the clock signal is usually four times the chrominance-subcarrier frequency, i.e., about 14.3 MHz in NTSC receivers, about 17.7 MHz in PAL receivers, and about 17.1 MHz in SECAM receivers.

Digital delay lines of the kind needed here are described, for example, in the published European Applicant No. EP-A-116 669. The essential feature of such delay lines is that they can be set to an exactly constant time delay which is maintained constant by means of an automatic control system. The number n of delay stages can be arbitrary, but it is advantageous to choose a power of two for this number, as will be explained below.

The output of each of the delay stages of the delay line d1 is coupled to the data input of a stage of the data register dr, whose dynamic write-enable input is presented with the clock signal fc. On the occurrence of each leading or trailing edge of the clock pulses, the data contained at that instant in the delay line d1, where it represents a character signal zs, is transferred to the data register dr. Since the pulse duration of such a character signal is generally slightly longer than the delay introduced by the delay line d1, either the leading edge or the trailing edge of such a character-signal pulse will be contained in the delay line and transferred to the data register in the form of a 0-to-1 or 1-to-0 transition. Due to the nonsynchronism between the clock signal and the character signals, the aforementioned pulse edge of the character signal, viewed over several clock periods, will travel through the delay line d1.

The outputs of the data register dr are coupled to the inputs of the first code converter c1, which is clocked by the first clock signal fc, and whose output data word dw is nonredundant and, together with the data signal ds of the first stage of the data register dr, forms the output signal of this subcircuit. The code converter c1 changes the "thermometer" code received from the data register dr to a nonredundant code, i.e., if n is a power of two (see above), the data word dw will be represented by the straight binary code or by any other nonredundant binary code (Gray code etc.).

Figure 3:
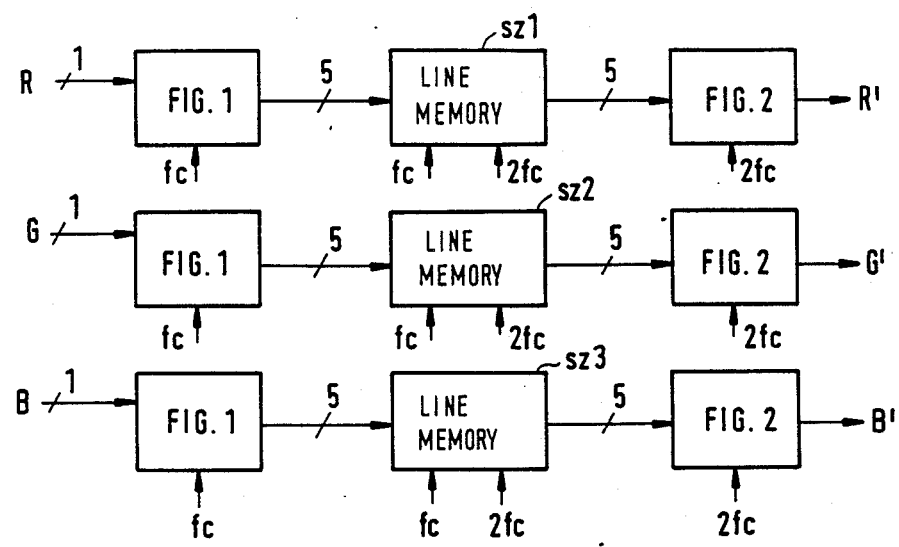
FIG. 3 is a block diagram of an interface circuit in accordance with the invention.

FIG. 3 shows how one-bit R, G, and B character signals R, G, and B are each fed to one of the subcircuits of FIG. 1, and how the output data words dw and the data signals ds are applied to the inputs of the line memories sz1, sz2, and sz3, respectively. These three line memories are clocked both by the clock signal fc and by the clock signal 2fc, which has twice the frequency of the clock signal fc, and accept the output data word dw and the data signal ds at the horizontal frequency, but read them out at twice the horizontal frequency.

Figure 2:
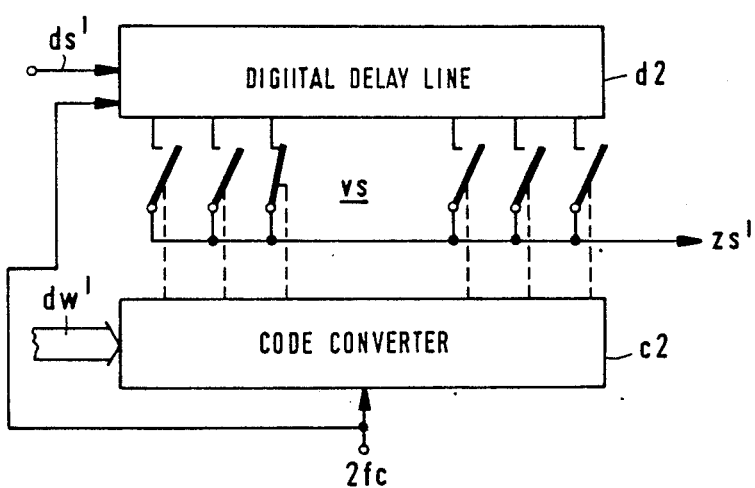
FIG. 2 is a block diagram of another subcircuit of the invention.

The arrangement shown in the block diagram of FIG. 2 is an embodiment of an output subcircuit and corresponds in design to the input subcircuit of Fig. 1. As shown in FIG. 3, three such arrangements are associated with the three line memories sz1, sz2, and sz3, respectively. They process the delayed data words dw' and data signals ds' appearing at the output of the three line memories into the corrected character signals R', G', B'. The arrangement of FIG. 2 contains the second digital delay line d2, which consists of n like, cascaded delay stages that give a delay equal to half the period of the clock signal fc. For this delay line, too, the delay line described in the above reference can be used. It is fed with the delay data signal ds'.

The arrangement of FIG. 2 further includes the second code converter c2, which is clocked by the clock signal 2fc of twice the frequency of the clock signal fc, and whose input is presented with the delayed output data word dw'. The output code of the second code converter c2 is the 1-out-of-n code. Each of the n output lines of the code converter c2 is connected to the control input of one of the ON/OFF switches of an electronic multiple switch vs, whose interconnected outputs provide the character signal zs' to be processed in the color-television receiver. In FIG. 3, these signals are the character signals R', B', G'. The input of each of the ON/OFF switches of the multiple switch vs is connected to the output of one of the delay stages of the second delay line d2.

Figure 4:
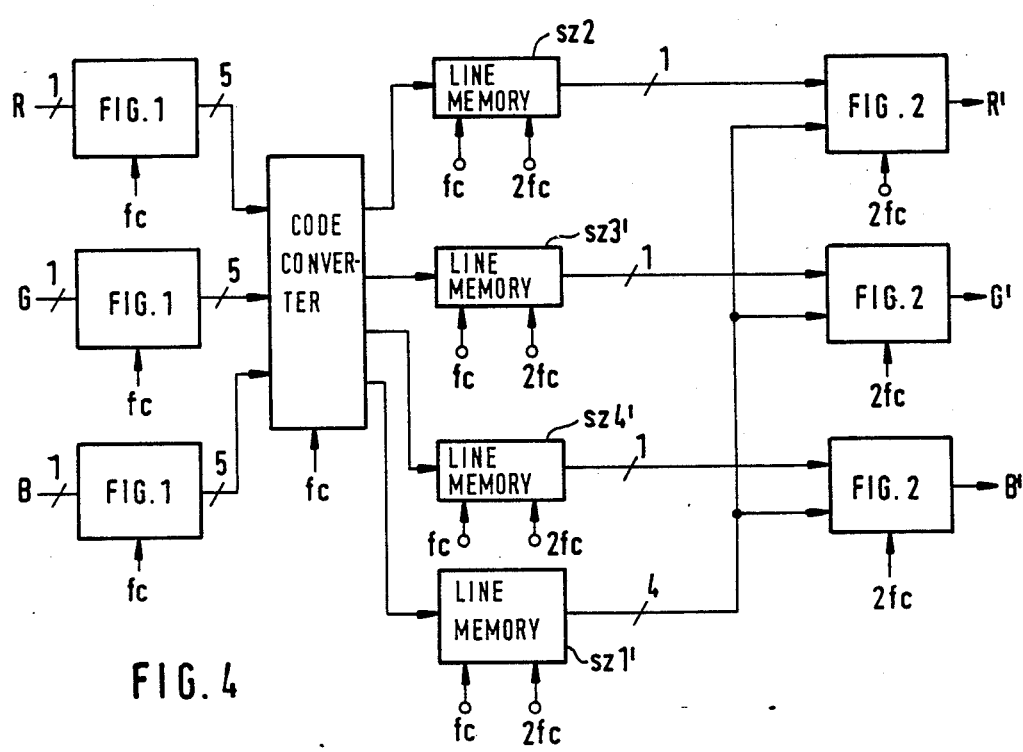
FIG. 4 is a block diagram of a preferred embodiment of the arrangement of FIG. 3.

FIG. 4 shows a preferred embodiment of the arrangement of FIG. 3 in which the number of lines that has to be stored in the line memories is reduced to about one half. To this end, there is provided the third code converter c3, which is fed with the three output data words dw of the three first code converters c1 and the three data signals ds from the first stages of the three data register dr. On the occurrence of each clock pulse, the third code converter c3 transfers only the longest of the three output data words dw to the first line memory sz1', while it feeds the three data signals to the second, third, and fourth line memories sz2', sz3' and sz4, respectively. The output of the first line memory sz1' is coupled to the associated inputs of the three second code converters c2, while the output of each of the other line memories sz2', sz3', and sz4 is connected to the associated input of one of the three second delay lines.

In FIGS. 3 and 4, the numbers at the diagnosis in the interconnecting lines indicate the number of bits of the digital signals on these lines and, thus, the number of conductors of the buses if parallel processing is performed. For this numerical example, it is assumed that the character signals are one-bit signals, and that $n = 2^4 = 16$, so that the output data words are four-bit words. From this numerical example, it is thus readily apparent that a line-memory unit with a capacity of 15 lines is required in the arrangement of FIG. 3, while the corresponding line-memory unit in the arrangement of FIG. 4 needs to have a capacity of only 7 lines. Since the third code converter c3 can be of simpler design than the circuitry for those lines of the line-memory unit which are not needed, the overall arrangement of FIG. 4 is simpler in construction, so that it will occupy less chip area if the invention is implemented in the form of an integrated circuit.

As the arrangement in accordance with the invention is an all-digital circuit, it is particularly suited to integration by means of insulated-gate field-effect transistors, i.e., in MOS technology.

What is claimed is:

1. An interface circuit in a color television receiver which reproduces a video signal containing interlaced fields after analog-to-digital conversion by means of a sampling signal, after digital signal processing in a digital circuit system controlled by said sampling signal which is used as a clock signal, and after digital-to-analog conversion at twice the horizontal frequency, said interface circuit providing the coupling between said receiver and a home computer which provides at least onebit digital color character signals each having a minimum pulse duration approximately equal to but different than the period of said clock signal, said interface circuit comprising:
   a first input circuit, a first line memory and a first output circuit for character signals of a first color;
   a second input circuit, a second line memory and a second output circuit for character signals of a second color;
   a third input circuit, a third line memory and a third output circuit for character signals of a third color;
   each of said first, second and third input circuits comprising:
      a first digital delay line including a plurality of cascaded delay stages each having a delay equal to the period of said clock signal, said delay line receiving the character signals of the respective color at its input;
      a data register having a plurality of cells, each cell having a data input coupled to the output of a corresponding one of said delay stages, said data register having a dynamic write-enable input to which said clock signal is applied, the output of a first one of said plurality of cells providing a data signal output; and
      a code converter having a plurality of inputs connected to the outputs of said data register, said code converter being clocked by said clock signal and providing a nonredundantly coded output data word;
   said first, second and third line memories each receiving and storing at the frequency of said clock signal the data signal output and the output data word of the respective one of said first, second and third inputs circuits, the data signal outputs and the output data words stored in said first, second and third line memories being read at twice the frequency of said clock signal;
   each of said first, second and third output circuits comprising:
      a second digital delay line comprising a plurality of like cascaded second delay stages each having a delay equal to one half the period of said clock signal, said second digital delay line receiving at its input the data signal output read from the respective line memory; and
      selection means responsive to the output data word read from the respective line memory for electively coupling the output of one of said plurality of second delay stages to an output terminal.

2. An interface circuit in accordance with claim 1, wherein:
   said selection means comprising an electronic switch having a plurality of inputs each connected to one output of said plurality of second delay stages, having a single output coupled to said output terminal, and having control inputs; and
   a second code converter having inputs responsive to said output data word read from the respective line memory for providing control signals to said control inputs whereby said electronic switch couples the output of one of said plurality of second delay stages to said output terminal.

3. An interface circuit in a color television receiver which reproduces a video signal containing interlaced fields after analog-to-digital conversion by means of a sampling signal, after digital signal processing in a digital circuit system controlled by said sampling signal which is used as a clock signal, and after digital-to-analog conversion at twice the horizontal frequency, said interface circuit providing the coupling between said reciever and a home computer which provides at least one-bit digital color character signals each having a minimum pulse duration approximately equal to but different than the period of said clock signal, said interface circuit comprising:

a first input circuit, a first line memory and a first output circuit for character signals of a first color;

a second input circuit, a second line memory and a second output circuit for character signals of a second color;

a third input circuit, a third memory and a third output circuit for character signals of a third color;

each of said first, second and third input circuits comprising:

a first digital delay line including a plurality of cascaded delay stages each having a delay equal to the period of said clock signal, said delay line receiving the character signals of the respective color at its input;

a data register having a plurality of cells, each cell having a data input coupled to the output of a corresponding one of said delay stages, said data register having a dynamic write-enable input to which said clock signal is applied, the output of a first one of said plurality of cells providing a data signal output; and a code converter having a plurality of inputs connected to the outputs of said data register, said code converter being clocked by said clock signal and providing a nonredundantly coded output data word;

an additional code converter receiving and selecting the longest of the output data words of said first, second and third input circuits as a second output data word;

a fourth line memory for receiving and storing at the frequency of said clock signal said second output data word and for reading out the stored second output data word at twice the frequency of said clock;

said first, second and third line memories each receiving and storing at the frequency of said clock signal the data signal output of the respective one of said first, second and third inputs circuits, the data signal outputs stored in said first, second and third line memories being read at twice the frequency of said clock signal;

each of said first, second and third output circuits comprising:

a second digital delay line comprising a plurality of like cascaded second delay stages each having a delay equal to one half the period of said clock signal, said second digital delay line receiving at its input the data signal output read from the respective line memory; and selection means responsive to the second output data word read from said fourth line memory for selectively coupling the output of one of said plurality of second delay stages to an output terminal.

4. An interface circuit in accordance with claim 3, wherein:

said selection means comprising an electronic switch having a plurality of inputs each connected to one output of said plurality of second delay stages, a single output coupled to said output terminal, and control inputs; and a second code converter having inputs responsive to said output data word read from the respective line memory for providing control signals to said control inputs whereby said electrnic switch couples the output of one of said plurality of second delay stages to said output terminal.

* * * * *